(12) United States Patent
Sezai

(10) Patent No.: US 6,259,397 B1
(45) Date of Patent: Jul. 10, 2001

(54) RADIO WAVE SOURCE INFORMATION DISPLAY APPARATUS

(75) Inventor: Toshihiro Sezai, Abiko (JP)

(73) Assignee: National Space Development Agency of Japan, Tokyo (JP)

( * ) Notice: Subject to any disclaimer, the term of this patent is extended or adjusted under 35 U.S.C. 154(b) by 0 days.

(21) Appl. No.: 09/406,797

(22) Filed: Sep. 28, 1999

(30) Foreign Application Priority Data

Sep. 30, 1998 (JP) .................................................. 10-291363

(51) Int. Cl.[7] .............................. G01S 13/00; G01S 7/04
(52) U.S. Cl. ........................... 342/196; 342/158; 342/176
(58) Field of Search .................................. 342/158, 176, 342/192, 196, 197, 195

(56) References Cited

U.S. PATENT DOCUMENTS

| 4,243,988 | * | 1/1981 | Kang et al. ........................... 342/158 |
| 5,532,699 | | 7/1996 | Smith .................................. 342/195 |

FOREIGN PATENT DOCUMENTS

| 31 36 625 | 3/1983 | (DE) . |
| 0 715 182 | 6/1996 | (EP) . |
| 0 989413 A1 | 3/2000 | (EP) . |
| 47-8475 | 5/1972 | (JP) . |
| 62-69225 | 3/1987 | (JP) . |
| 8-43525 | 2/1996 | (JP) . |
| 8-327721 | 12/1996 | (JP) . |

* cited by examiner

*Primary Examiner*—Ian J. Lobo
(74) *Attorney, Agent, or Firm*—Armstrong, Westerman, Hattori, McLeland & Naughton, LLP

(57) ABSTRACT

A radio wave source information display apparatus including: a signal processing circuit having a means for performing the Fourier transform with respect to azimuth of an electric field signal outputted from an antenna receiving circuit, a means for performing the Fourier transform with respect to azimuth of the antenna pattern of an antenna, a means for dividing the Fourier transform signal derived from the electric field signal by the antenna pattern Fourier transform signal, a low-pass filter for subjecting the divided signal to low-pass filtering with respect to azimuthal frequency, a means for extracting exponential function components of the output signal of the low-pass filter, and a means for obtaining radio wave source information from the extracted exponential function components; and a display section for displaying radio wave source information obtained at the signal processing circuit. Provided hereby is the radio wave source information display apparatus in which exponential function components contained in a radio wave source spectrum signal obtained in the process of applying deconvolution method to antenna response is extracted so as to directly obtain and display radio wave source information.

4 Claims, 3 Drawing Sheets

RADIO WAVE SOURCE INFORMATION DISPLAY APPARATUS

BACKGROUND OF THE INVENTION

1. Field of the Invention

The present invention relates to a radio wave source information display apparatus in which exponential function components contained in a radio wave source spectrum signal obtained in the process of applying a deconvolutional method to antenna response are extracted so as to directly obtain and display radio wave source information.

2. Description of the Related Art

When observing target objects, for example, in using a radar, a method has been generally used in which the pointing direction of an antenna beam is changed, for example, by rotating the antenna to received radio waves from the respective azimuths pointed to by the antenna beam, so as to observe the intensity of the received radio wave (antenna response) with respect to the azimuths. In doing so, the use of an antenna with a narrower beamwidth results in an antenna response approximating the distribution of the radio wave sources and, hence, improves the azimuth resolution of the radar. To improve antenna resolution in the conventional art thus means to obtain an antenna response more closely approximating the distribution of the radio wave sources. Although another method is also known such as in a synthetic aperture radar where antenna resolution is improved by subjecting the received radio wave to a signal processing, this method, too, intents to obtain an antenna response approximating the distribution of the radio wave sources by achieving through the signal processing an effect equivalent to that of reducing the antenna beamwidth.

The above conventional technique for improving the antenna resolution is a method of indirectly obtaining the distribution of the radio wave sources from the antenna response and has a problem that the distribution of the radio wave sources cannot be directly obtained. If there existed an antenna having its pattern represented by the Dirac delta function, the antenna response at such antenna would correspond to the response of the radio wave sources. It is known from the antenna theory, however, that an antenna having such a pattern does not exist. Accordingly, since an actual antenna pattern has a finite beamwidth and sidelobes, there is a problem that the distribution of the observable radio wave sources is distorted by the antenna pattern.

By contrast, a method is well known as a technique for improving resolution, for example, of radar in which a radio wave source distribution function is obtained by using a deconvolution method to improve the resolution. The technique for obtaining a radio wave source distribution function by using the deconvolution method includes the steps of: effecting a Fourier transform with respect to azimuth of a received electric field signal obtained from the antenna while moving the antenna beam; effecting a Fourier transform with respect to azimuth of a received electric field signal pattern of the antenna in the presence of one point wave source; dividing a signal resulting from the Fourier transform with respect to azimuth of said antenna received electric field signal by a signal resulting from the Fourier transform with respect to azimuth of said received electric field signal pattern of the antenna in the presence of one point wave source; and subjecting the divided signal to a Fourier inverse transform with respect to azimuth, the Fourier inverse transform signal being outputted as a final antenna output.

The operation for obtaining radio wave source distribution function by the deconvolution method is explained in further detail as follows. In particular, supposing $\theta$ is the azimuth, $g(\theta)$ is an antenna pattern and $f(\theta)$ is a wave source distribution function, an antenna-received electric field $e(\theta)$ is given by the form of a convolution integral as in [the] equation (1).

$$e(\theta) = \int f(\theta) \cdot g(\theta - \phi) d\phi \tag{1}$$

It should be noted that $f(\theta)$ in the equation (1) is identical [as] to the wave source distribution function $f(\theta)$ and $\phi$, representing an integral variable (an expedient variable in the integral equation), has the same unit of azimuth as $\theta$.

In general, the antenna pattern $g(\theta)$ is measured as an electric field received at the antenna in the presence of one point source of wave. Here, supposing $E(\omega)$, $F(\omega)$, $G(\omega)$ as the functions resulting from Fourier transform in respect of azimuth, respectively, of $e(\theta)$, $f(\theta)$, $g(\theta)$ i.e., as azimuthal frequency functions, the equation (1) may be represented by the form of a multiplication as in the following equation (2).

$$E(\omega) = F(\omega) \cdot G(\omega) \tag{2}$$

where $G(\omega)$ is an azimuthal frequency function of antenna pattern, i.e., a transfer function with respect to azimuthal frequency of the antenna. Since the antenna pattern $g(\theta)$ is determined when the antenna to be used is decided, $G(\omega)$ can be obtained by calculation from $g(\theta)$. Further, $E(\omega)$ is an azimuthal frequency function of the antenna-received electric field $e(\theta)$ and can be obtained by calculation from a measured value of the electric field signal $e(\theta)$ received by the antenna at each pointing angle. Accordingly, $E(\omega)$, $G(\omega)$ are known and the azimuthal frequency distribution function $F(\omega)$ of the wave source can be obtained by $$F(\omega) = E(\omega)/G(\omega) \tag{3}$$

As described above, $F(\omega)$ is the Fourier transform with respect to azimuth of the distribution function $f(\theta)$ of the wave source. It is therefore possible to obtain the wave source distribution function $f(\theta)$ by a Fourier inverse transform with respect to azimuth of $F(\omega)$ which is represented by the equation (3). It should be noted that "$\omega$" represents spatial frequency.

Here, the above described known technique for improving antenna resolution by using the deconvolution method is to obtain only the radio wave source distribution by removing skewness of antenna pattern from antenna response which is a radio wave source distribution skewed by antenna pattern. Fundamentally in the deconvolution method, the signal resulting from Fourier transform of antenna response in respect of azimuth is divided as described above by the signal resulting from Fourier transform of antenna pattern with respect to azimuth, or after multiplying the signal resulting from Fourier transform of antenna response with respect to azimuth by an inverse filter based on the antenna pattern, such signal is subjected to Fourier inverse transform with respect to azimuth. Thereby a radio wave source distribution function is obtained.

In actuality, however, the radio wave source distribution is not obtained in the form of a function even when the deconvolution method is used, and it is given merely as function values for respective azimuths. Accordingly, a further processing is necessary with the deconvolution method to extract radio wave source information from the signal after Fourier inverse transform is performed. Usually, for example, the signal after Fourier inverse transform is graphed and processing is effected, for example, to obtain the position and size of radio wave source from the graph. The deconvolution method thus has a problem in that radio wave source information cannot be directly extracted.

SUMMARY OF THE INVENTION

In view of the above problems in the conventional technique for improving resolution by using a deconvolution method, it is an object of the present invention to provide a radio wave source information display apparatus capable of directly obtaining radio wave source information.

To solve the above problems, there is provided a radio wave source information display apparatus in accordance with the present invention including: an antenna for receiving radio waves; a means for moving the pointing direction of an antenna beam of the antenna toward the direction of objects to be observed; a means for performing a Fourier transform with respect to azimuth of a received electric field signal obtained from the antenna while moving the antenna beam; a means for performing a Fourier transform with respect to azimuth of a received electric field pattern of the antenna in the presence of one point wave source; a means for dividing a signal resulting from the Fourier transform with respect to azimuth of the antenna-received electric field signal by a signal resulting from the Fourier transform with respect to azimuth of the received electric field pattern of the antenna in the presence of one point wave source, a low-pass filter for subjecting the divided output signal of the division means to low-pass filtering with respect to azimuthal frequency; a means for extracting exponential function components of the output signal of the low-pass filter; a means for obtaining radio wave source information on the basis of the exponential function components extracted at the extraction means; and a display means for displaying radio wave source information obtained at the means for obtaining.

In the thus constructed radio wave source information display apparatus, the signal obtained by division at the division means corresponds to a radio wave source distribution spectrum signal obtained in the course of the deconvolution method and is a Fourier transform with respect to azimuth of the radio wave source distribution function. Here the radio wave source distribution can be modeled as the sum of a number of discrete radio wave sources. It is well known that, since a discrete radio wave source can be considered as a point wave source, its Fourier transform is expressed as an exponential function in the frequency domain. Accordingly, the radio wave source distribution spectrum is expressed as the sum of exponential functions. It therefore becomes possible to directly obtain and display information relating to radio wave source distribution by processing the radio wave source distribution spectrum at the exponential function component extraction means to extract exponential function components.

The reason for performing low-pass filtering of the divided output signal before extracting exponential function components at the exponential function component extraction means in the present invention is as follows. In particular, since a band in spatial frequency exists physically in the signal derived from Fourier transform of the received electric field pattern of antenna, components in a region exceeding such band cannot be possessed. Frequency components of regions beyond the above described band, however, are contained in the divided signal (radio wave source distribution spectrum) which is acquired by performing signals processing a the division means. This occurs due to the difference between the actual processing and theoretical processing. If the signal components of the regions beyond such band are used as they are to perform processing at the next stage (extracting of exponential functions), a signal degradation results. Accordingly, the signal components of regions beyond the above described band are removed by performing low-pass filtering at such stage, so as to prevent degradation of a signal.

DETAILED DESCRIPTION OF THE PREFERRED EMBODIMENT

Figure 1:
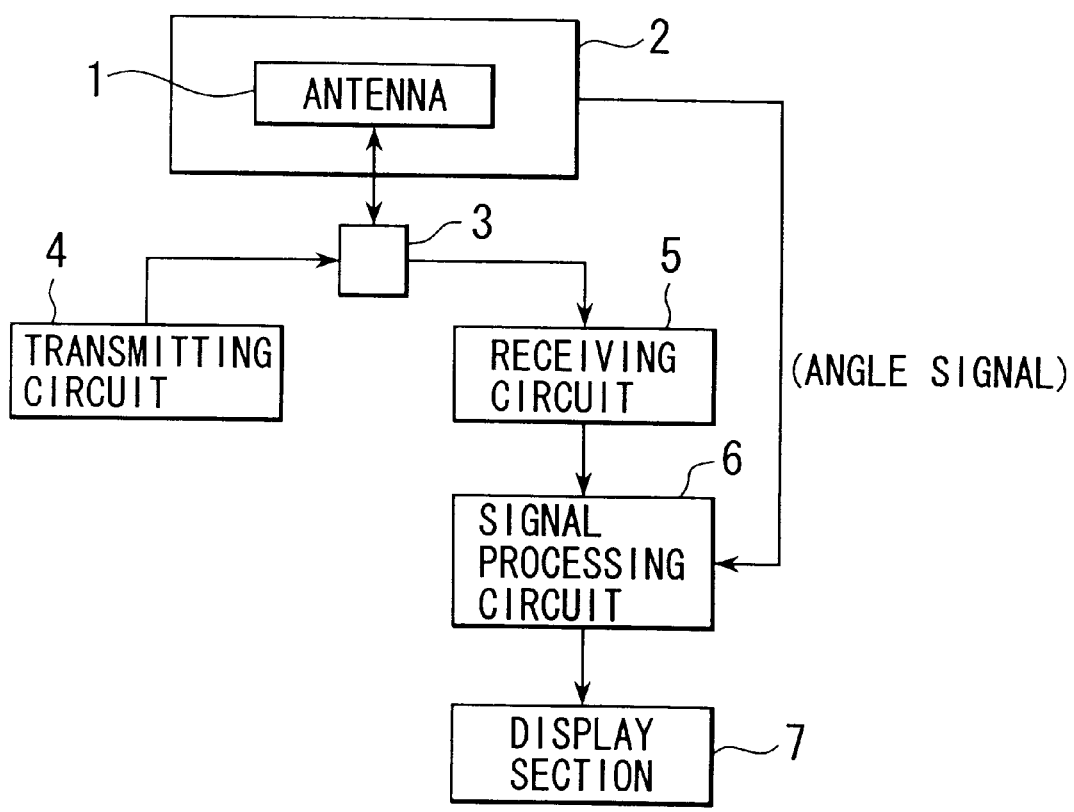
FIG. 1 is a block diagram showing an embodiment of the radio wave source information display apparatus according to the present invention.

A preferred embodiment of the present invention will now be described. FIG. 1 is a schematic block diagram showing an embodiment where the radio wave source information display apparatus according to the present invention is applied to a radar apparatus, referring to FIG. 1, what is denoted by numeral 1 is an antenna for transmitting and receiving radio waves, which may be of any type such as a dipole antenna, horn antenna, parabola antenna, array antenna, etc. An antenna rotating device 2 rotates the antenna toward the direction of radio wave sources to be observed. A changeover switch 3 switches the connection between the antenna 1 and a transmitting circuit or a receiving circuit to be described below. Denoted by numeral 4 is a transmitting circuit, the transmitting power outputted from the transmitting circuit 4 being transmitted from the antenna 1 by way of the changeover switch 3. A receiving circuit 5 converts a radio wave received at the antenna 1 into an electric field signal.

Figure 2:
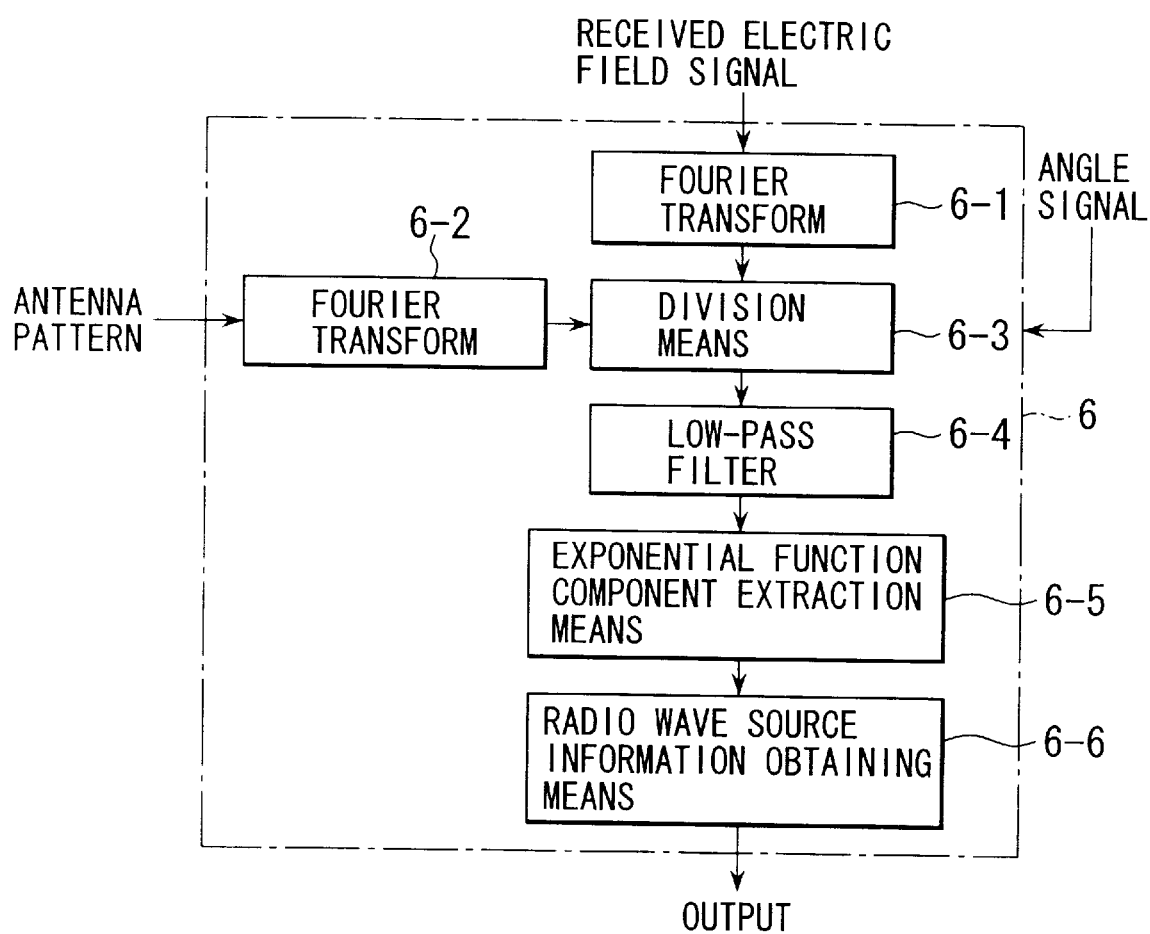
FIG. 2 is a block diagram showing construction of the signal processing circuit in the embodiment shown in FIG. 1.

Denoted by numeral 6 is a signal processing circuit, which as shown in FIG. 2 includes: a means 6-1 for accepting a signal of an angle from the antenna rotating device 2 and effecting a Fourier transform with respect to azimuth of a received electric field signal outputted from the receiving circuit 5; a means 6-2 for effecting a Fourier transform with respect to azimuth of the antenna pattern related to radar of the antenna 1; a means 6-3 for dividing the received electric field signal after the Fourier transform by the antenna pattern signal after the Fourier transform; a low-pass filter 6-4 for effecting low-pass filtering of the divided signal with respect to azimuthal frequency; a means 6-5 for extracting exponential function components of the signal passed through the low-pass filter 6-4; and a means 6-6 for obtaining radio wave source information from the extracted exponential function components. Denoted by numeral 7 is a display section for displaying the radio wave source information obtained at the signal processing circuit 6. It should be noted that one to which the Prony method for obtaining exponential function components from acquired data by using matrix operation is applied, for example, is used as the exponential function component extracting means 6-5. Further, the display section 7 to be used, for example, displays the radio wave source information by means of a table of displays it in a graphic form.

A description will now be given with respect to the operation of a radar apparatus to which the radio wave source information display apparatus according to the present invention constructed as the above is applied. A radio wave corresponding to the antenna pattern is transmitted from the antenna 1 while rotating the antenna 1. When the radio wave transmitted from the antenna 1 is returned as reflected by a scattering object, a received radio wave corresponding to the antenna pattern is outputted by the antenna 1. The received radio wave is converted into a receiving electric field signal at the receiving circuit 5 and is then inputted to the signal processing circuit 6. In the signal processing circuit 6, a Fourier transform processing of the electric field signal is effected at the Fourier transform means 6-1 and it is then divided at the division means 6-3 by an antenna pattern signal which has been subjected to a Fourier transform at the Fourier transform means 6-2. Then, after performing low-pass filtering through the low-pass filter 6-4, the exponential function components are extracted by the exponential function component extraction means 6-5. Information on angel and size of the scattering objects (radio wave source) is then obtained at the radio wave source information obtaining means 6-6 on the basis of the extracted exponential function components. The radio wave source information obtaining means is displayed at the display section 7.

A further description will be given below with respect to the extraction of exponential function components to obtain information on radio wave source. Supposing a point wave source having its size "A" in terms of radio wave existing at a position of $\theta_0$, the point wave source "A" is expressed in a numerical formula as the function in the following expression (4).

$$A \cdot \delta(\theta - \theta_0) \quad (4)$$

where $\delta$ is the Dirac delta function. Fourier transform of this function is expressed by the exponential function indicated by he following expression (5).

$$A \cdot \exp(-j\omega\theta_0) \quad (5)$$

where: j is imaginary unit; $\omega$ is spacial frequency; and A is generally a complex number, size in terms of the radio wave of the radio wave source and its phase and the position of the wave source are correspondingly obtained from the relationship between the above expressions (4) and (5).

Table 1 shows in tabular form a simulation result of radio wave source information obtained in the presence of two points of scattering object regarded as identical radio wave to each other and separated by 5 degree at an equidistance from the antenna, in the case where the antenna 1 is rotated by using as the antenna 1 an aperture antenna (antenna beamwidth: 5 degree) having a uniform distribution of the antenna length in rotating direction being 10.16 times the wavelength. It is seen that, with the radio wave source information obtained by the present invention, almost the same information as the actual radio wave source information can be obtained though phase of radio wave is somewhat different.

TABLE 1

| Size in terms of radio wave (relative value) | Radio wave phase (degree) | Radio wave source position (degree) |
|---|---|---|
| Obtained radio wave source information | | |
| 1.0000 | 1.9000 | 2.5000 |
| 1.0000 | −1.9000 | −2.5000 |

TABLE 1-continued

| Size in terms of radio wave (relative value) | Radio wave phase (degree) | Radio wave source position (degree) |
|---|---|---|
| Actual radio wave source information | | |
| 1.0000 | 0.0000 | 2.5000 |
| 1.0000 | 0.0000 | −2.5000 |

Figure 3:
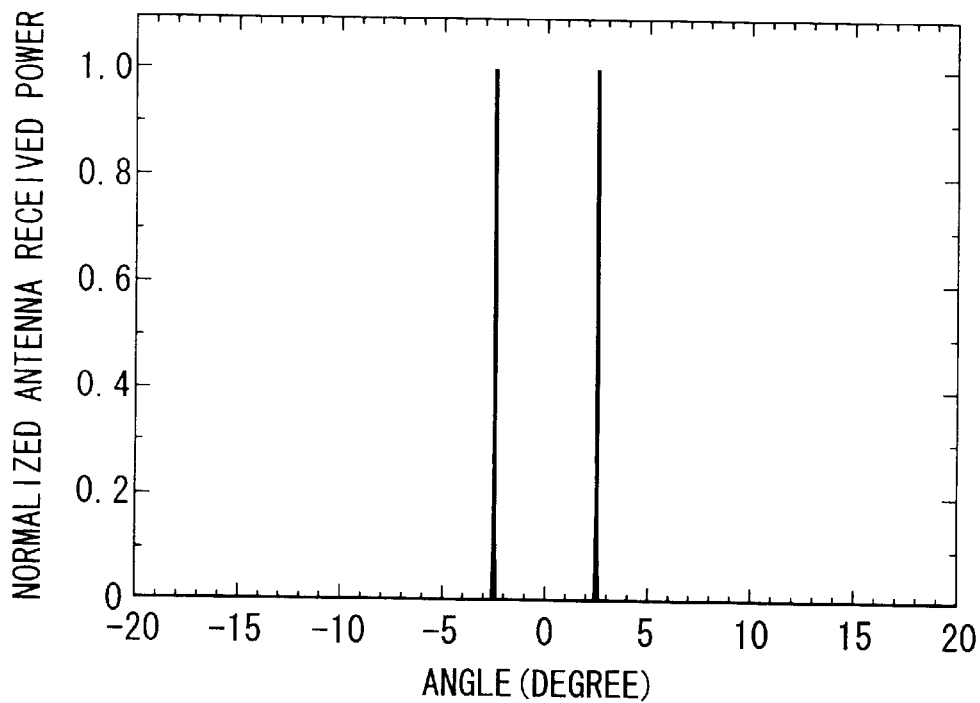
FIG. 3 shows the result of a simulation of antenna-received power response by radio wave source information display apparatus according to the present invention.
Figure 4:
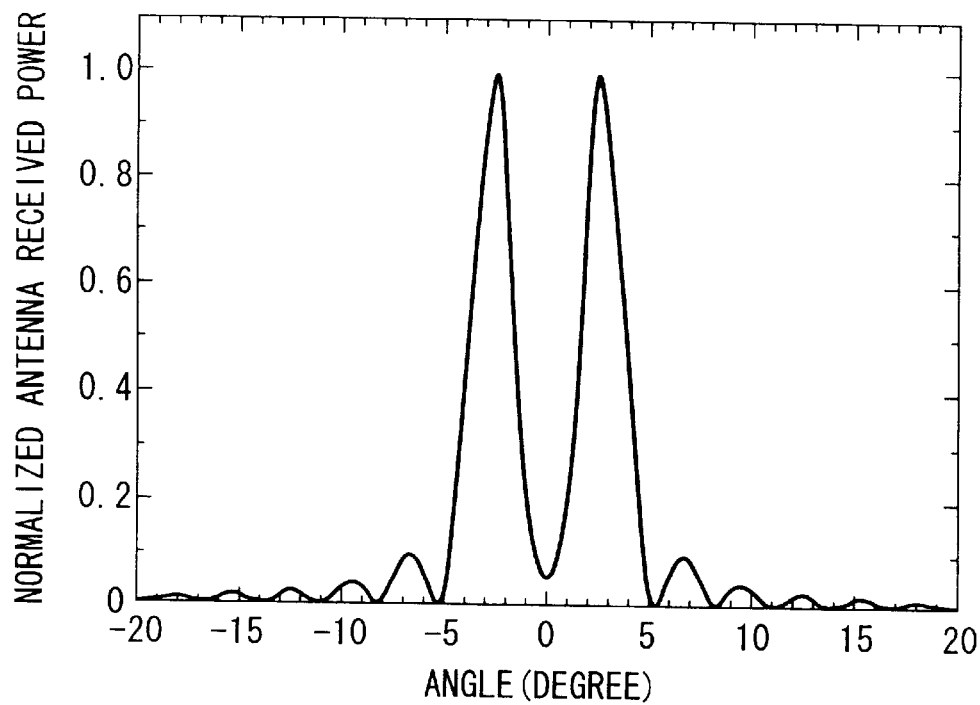
FIG. 4 shows the result of a simulation of antenna-received power response by the conventional deconvolution method.

FIG. 3 shows in graphic form a simulation result of radio wave source information obtained by the radio wave source information display apparatus according to the present invention using an antenna of the above described construction. FIG. 4 shows, for comparison, radar response in the case of a simulation based on the known deconvolution method using the same antenna.

As can be seen from these figures, with the conventional deconvolution method as shown in FIG. 4, the obtained radio wave source distribution function values are once displayed such as on a graph and are then subjected for example to processing for obtaining their peak position and function value at such position. Thereafter, information on the radio wave source is obtained. Since, in FIG. 4, the response results as having its peak approximately at −2.5 degree and at +2.5 degree, what can be extracted is only the information of the existence of scattering objects in the vicinity thereof. For example, a judgement cannot be made about an absence of scattering object at −2 degree or about a presence of scattering object as having its size of about 0.8 relative to the peak. According to the present invention on the other hand, since the information shown in Table 1 can be obtained, it is clearly seen that no scattering objects exist except at −2.5 degree and at +2.5 degree.

While the above embodiment has been described as one using a mechanical antenna rotating device as the means for moving the pointing direction of the antenna beam toward the direction of the radio wave source to be observed, those which can be used as the means for moving the pointing direction of the antenna beam include: an electronic antenna beam scanning means; a means for moving antenna beam as mounted on a mobile platform such as an aircraft or satellite, etc.

As has been described by way of the above embodiment, in accordance with the present invention, a Fourier transform signal with respect to azimuth of an electric field received at the antenna is divided by a Fourier transform signal with respect to azimuth of the antenna pattern. The divided signal is passed through a low-pass filter in respect of azimuthal frequency and the exponential function components are extracted of the passed signal. Information on the radio wave source is obtained on the basis of such exponential function components and the radio wave source information is displayed. It is thus possible to directly obtain and display the radio wave source information at high accuracy.

What is claimed is:

1. A radio wave source information display apparatus comprising:

an antenna for receiving radio waves;

means for moving the pointing direction of an antenna beam of the antenna toward the direction of a wave source to be observed;

means for effecting a Fourier transform with respect to azimuth of a received electric field signal obtained from the antenna while moving said antenna beam;

means for effecting a Fourier transform with respect to azimuth of a received electric field pattern of the antenna in the presence of one point wave source;

means for dividing a signal resulting from the Fourier transform with respect to azimuth of said antenna received electric field signal by a signal resulting from the Fourier transform with respect to azimuth of said received electric field pattern of the antenna in the presence of one point wave source; and a low-pass filter for subjecting the divided output signal of the division means to a low-pass filtering with respect to azimuth frequency;

means for extracting exponential function components of the output signal of the low-pass filter;

means for obtaining radio wave source information on the basis of the exponential function components extracted at the extraction means; and display means for displaying radio wave source information obtained at the means for obtaining.

2. The radio wave source information display apparatus according to claim 1, wherein said means for moving the pointing direction of an antenna beam comprises an antenna rotating device.

3. The radio wave source information display apparatus according to claim 1, wherein said means for moving the pointing direction of an antenna beam comprises an electronic antenna beam scanning device.

4. The radio wave source information display apparatus according to claim 1, wherein said means for moving the pointing direction of an antenna beam comprises an antenna moving device.

* * * * *